April 21, 1942.          N. ANDROS          2,280,612
FOOD SERVICE INSTRUMENT
Filed May 14, 1938
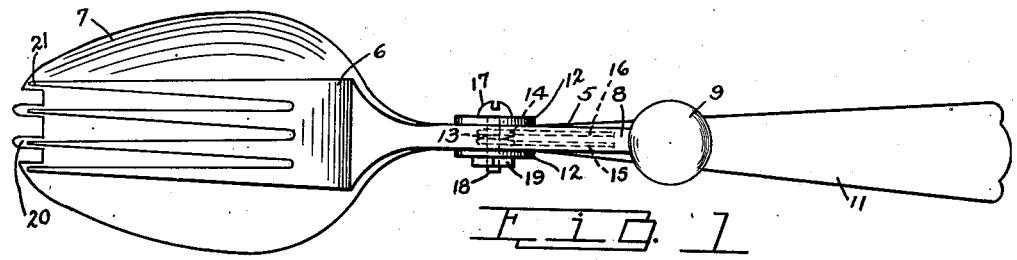
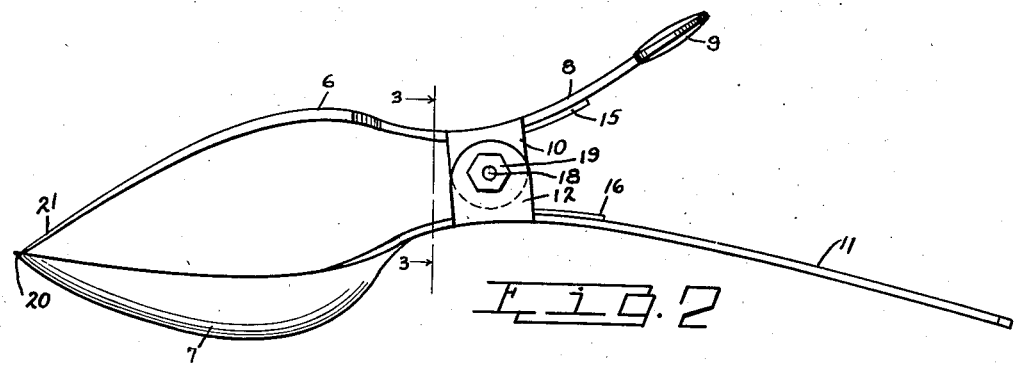
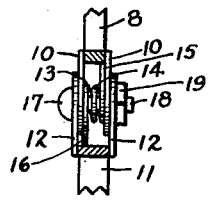
Inventor
NICHOLAS ANDROS Patented Apr. 21, 1942

2,280,612

UNITED STATES PATENT OFFICE 2,280,612

FOOD SERVICE INSTRUMENT

Nicholas Andros, Los Angeles, Calif.

Application May 14, 1938, Serial No. 208,073

2 Claims. (Cl. 30—150)

The present invention relates to a food service instrument.

In the serving of food in homes, restaurants and hotels, it very often happens that the servant, waiter or waitress in serving a food portion, the food will fall from the instrument generally used, such as a spoon or fork, with the result that table linen or the clothes of those being served is soiled.

It is an object of the present invention to provide a food instrument that will firmly grip food to be served.

Another object of the present invention is the provision of a food instrument that may be operated by one hand, leaving the other hand free to assist in serving.

A still further object of the present invention is the provision of means for catching drip from food being served.

A still further object of the present invention is the provision of means for gripping foods of various sizes.

A still further object of the present invention is the provision of means for keeping the food gripping means in a contracted position.

With these and other objects in view, the invention consists in the combination and arrangement of parts to be hereinafter described and claimed, reference being had to the accompanying drawing in which like numerals of reference indicate similar parts in the several views, and wherein:

Figure 1 is a top plan view of my novel food service instrument.

Figure 2 is a side elevational view of same.

Figure 3 is a sectional view taken on line 3—3 of Figure 2 and illustrating the assembly of the instrument.

Referring to the drawing, the numeral 5 represents my novel food service instrument, comprising a fork 6 and a spoon 7, the bowl of the spoon being deep. The reference numeral 8 represents the curved shank of the fork, one end of which terminates into a flat rounded portion 9. The shank 8 is provided with depending ears 10 that are apertured for a purpose to be later described.

The numeral 11 represents the shank of the spoon that is curved. As illustrated in the drawing, the shank of the spoon is of a greater length and width than the shank of the fork that provides a finger grip, leaving the thumb free to engage the portion 9 of the shank 8. The shank 11 is provided with upstanding ears 12 that are apertured and are in register with the apertures in the ears 10. The ears 10 are adapted to fit in the ears 12 and house an expansible spring member 13, having coils 14 and legs 15 and 16. The fork and spoon are secured together for pivotal movement by a bolt 17, the shank 18 of which passes through the apertures in the ears 10 and 12 and the coils 14, the end of the shank 18 being engaged by a nut 19 that locks the spoon and fork together. It is to be noted that the legs of the spring extend an appreciable distance from the ears, the leg 15 impinging the shank 8, and the leg 16 the shank 11.

The end of the spoon bowl is provided with a plurality of modified tines 20 that are wider than the fork tines 21 and they serve as a gripping means, and act in conjunction with the fork tines. The fork tines impinge the top face of the tines 20 and are normally held in this impinged position by the expansible spring member 13.

In the operation of my food instrument, the shank 11 is grasped by the fingers of one hand, the thumb engages the round portion 9 of the shank 8 and a slight pressure causes the fork tines to move away from the spoon. When the opening is of sufficient width to permit the grasping of the food the thumb is lifted from the portion 9, the spring having been compressed expands causing the food to be gripped between the spoon and fork.

Changes in detail may be made without departing from the scope of the claims hereto appended.

What I claim is:

1. A food serving implement comprising a fork, a spoon, and means pivotally securing the fork and spoon intermediate their ends with the faces of said fork and spoon in spaced opposed relation, said means comprising ears carried by the fork and spoon intermediate their ends and a pivot pin extending transversely through said ears, said ears extending beyond the faces of said fork and spoon and said fork and spoon being bowed in a manner whereby the handles of the fork and spoon are spaced apart adjacent the pivot pin a distance sufficient to accommodate the fingers of the user of the implement in the vicinity of the pivot pin.

2. A food serving implement comprising a fork, a spoon and means pivotally securing the fork and spoon intermediate their ends with the faces of said fork and spoon in spaced opposed relation, said means comprising ears carried by the fork and spoon intermediate their ends, a pivot pin extending transversely through said ears, and a coil spring encircling said pivot pin between said ears with the opposite ends of the coil spring laterally offset to bear one against the spoon face, the other against the fork face, said ears extending beyond the faces of said fork and spoon and said fork and spoon being bowed in a manner whereby the handles of the fork and spoon are spaced apart adjacent the pivot pin a distance sufficient to accommodate the fingers of the user of the implement in the vicinity of the pivot pin.

NICHOLAS ANDROS.